(12) United States Patent
Gu et al.

(10) Patent No.: US 11,209,078 B2
(45) Date of Patent: Dec. 28, 2021

(54) TRANSMISSION GEAR AND DECELERATION MECHANISM COMPRISING THE SAME

(71) Applicant: ABB Schweiz AG, Baden (CH)

(72) Inventors: Hao Gu, Shanghai (CN); Zhiqiang Tao, Beijing (CN)

(73) Assignee: ABB Schweiz AG, Baden (CH)

( * ) Notice: Subject to any disclaimer, the term of this patent is extended or adjusted under 35 U.S.C. 154(b) by 99 days.

(21) Appl. No.: 16/693,921

(22) Filed: Nov. 25, 2019

(65) Prior Publication Data
US 2020/0182345 A1 Jun. 11, 2020

(30) Foreign Application Priority Data

Dec. 7, 2018 (CN) .......................... 201822051009.1

(51) Int. Cl.
*F16H 55/17* (2006.01)
*F16H 55/06* (2006.01)

(52) U.S. Cl.
CPC ............. *F16H 55/17* (2013.01); *F16H 55/06* (2013.01)

(58) Field of Classification Search
CPC .... F16H 55/17; F16H 55/06; F16H 2055/065; B29L 2015/003
See application file for complete search history.

(56) References Cited

U.S. PATENT DOCUMENTS

| | | | | |
|---|---|---|---|---|
| 3,199,364 | A | * | 8/1965 | Dew ....................... F16H 55/06 74/460 |
| 3,696,685 | A | * | 10/1972 | Lampredi ............. F16H 55/171 474/161 |
| 4,589,860 | A | | 5/1986 | Brandenstein et al. |
| 4,600,372 | A | | 7/1986 | Barouh et al. |

(Continued)

FOREIGN PATENT DOCUMENTS

CN          201475284 U       5/2010

OTHER PUBLICATIONS

European Patent Office, Extended European Search Report issued in corresponding European application No. 19211199.5, dated Feb. 24, 2020, 7 pp.

(Continued)

*Primary Examiner* — Terence Boes
(74) *Attorney, Agent, or Firm* — Greenberg Traurig, LLP

(57) ABSTRACT

Embodiments of the present disclosure relate to a transmission gear and a deceleration mechanism including the same. The transmission gear includes a metal ring; and a plastic gear member integral with the metal ring by injection molding, the metal ring is coaxially wrapped in the plastic gear member and provided with a locating portion for locating the metal ring in an injection mold, the plastic gear member having an outer circumference that is tooth-shaped, and the plastic gear member being formed with an input hole thereon through which an input shaft passes, an outer ring surface of the metal ring being adjacent to the outer circumference, and an inner ring surface of the metal ring having (Continued)

a diameter greater than or equal to that of the input hole. Since almost no shrinkage occurs to the plastic gear member during injection molding, such a transmission gear has good dimensional accuracy, strength and rigidity.

20 Claims, 3 Drawing Sheets

(56) References Cited

U.S. PATENT DOCUMENTS

| | | | | |
|---|---|---|---|---|
| 5,852,951 | A  * | 12/1998 | Santi | B29D 15/00 |
| | | | | 74/443 |
| 2002/0056588 | A1* | 5/2002 | Kuze | F16H 55/06 |
| | | | | 180/444 |
| 2007/0089555 | A1* | 4/2007 | Tomoda | F16H 55/06 |
| | | | | 74/443 |
| 2008/0178697 | A1* | 7/2008 | Imagaki | B62D 5/0409 |
| | | | | 74/388 PS |
| 2009/0078066 | A1* | 3/2009 | Schuler | F16H 1/32 |
| | | | | 74/25 |
| 2021/0062905 | A1* | 3/2021 | Nakayama | B29C 45/14491 |

OTHER PUBLICATIONS

European Communication pursuant to Article 94(3) EPC, issued by the European Patent Office, regarding corresponding patent application Serial No. EP19211199.5; dated Jul. 26, 2021; 5 pages.

* cited by examiner

TRANSMISSION GEAR AND DECELERATION MECHANISM COMPRISING THE SAME

FIELD

The present disclosure generally relates to the field of plastic gear processing, and more specifically, to a transmission gear and a deceleration mechanism comprising the same.

BACKGROUND

It is known that in some deceleration mechanisms of low-cost industrial robots, a plastic gear made by injection molding is used as a transmission component in order to meet the needs of batch processing and cost reduction. For example, a plastic gearbox may be provided at the joints of some robot arms to achieve speed reduction or torque amplification.

FIG. 1 is a schematic front view of a plastic transmission gear 100 manufactured by an injection molding process in accordance with the prior art. As shown in FIG. 1, such a plastic transmission gear 100 with an outer circumference 101 that is tooth-shaped is formed with an input hole 102 through which an input shaft passes and a plurality of output holes 103 through which an output member passes (six output holes 103 as illustrated in the figure), to transmit a torque from the input shaft to the plurality of output members. The input hole 102 is formed at a center position of the plastic transmission gear 100, and the plurality of output holes 103 are formed at the same angular intervals around the circumference of the input hole 102, for example. The plastic transmission gear 100 is also provided with a pair of mounting holes 104 thereon which are symmetrical with respect to the center of the plastic transmission gear 100. When the plastic transmission gear 100 is being mounted in the gearbox, the pair of mounting holes 104 can act as a reference of an initial mounting angle for installation.

However, a plastic gear made by injection molding often has defects in terms of dimensional accuracy. Since the dimension of the injection mold itself can be very precise (up to the order of micron), such defects usually result from the shrinkage of the plastic material itself during injection molding, which is typically 0.3% of the design size.

It is known in the art to avoid such dimensional shrinkage by adjusting some of the process parameters (e.g., injection temperature, dwell time, etc.), or to compensate for such dimensional shrinkage by adjusting the size of the injection mold itself. However, these methods are time-consuming and require much manufacturing experience.

SUMMARY

The object of the present disclosure is to address the above-mentioned defects in the prior art and to provide a novel transmission gear and a deceleration mechanism comprising the same. The transmission gear has good dimensional accuracy, strength and rigidity because almost no shrinkage would occur to the plastic gear member during injection molding.

In the first aspect, the present disclosure provides a transmission gear comprising a metal ring and a plastic gear member integral with the metal ring by injection molding, wherein the metal ring is coaxially wrapped in the plastic gear member and provided with a locating portion for locating the metal ring in an injection mold, wherein the plastic gear member has an outer circumference that is tooth-shaped, and an input hole is formed on the plastic gear member for an input shaft to pass through, and wherein an outer ring surface of the metal ring is arranged adjacent to the outer circumference, and an inner ring surface of the metal ring has a diameter greater than or equal to that of the input hole.

According to a preferred embodiment of the present disclosure, the locating portion comprises at least two locating holes arranged in a circumferential direction of the metal ring at the same angular interval, and a mounting hole concentric with the locating hole formed on the plastic gear member.

According to a preferred embodiment of the present disclosure, the outer ring surface of the metal ring is of a tooth shape similar to the outer circumference.

According to a preferred embodiment of the present disclosure, the outer ring surface of the metal ring is of a circular shape.

According to a preferred embodiment of the present disclosure, a surface of the metal ring is coated with a non-skid coating or processed by corrosion treatment or knurling process to increase a degree of bonding with a plastic material.

According to a preferred embodiment of the present disclosure, the material of the metal ring is selected from aluminum, aluminum alloy and steel.

According to a preferred embodiment of the present disclosure, the metal ring is produced by extrusion or stamping.

According to a preferred embodiment of the present disclosure, an output hole is formed on the plastic gear member for a plurality of output members to pass through, the position of the output hole does not interfere with the positions of an outer ring surface, an inner ring surface of the metal ring and a locating portion of the metal ring.

According to a preferred embodiment of the present disclosure, the input hole is formed at a center position of the plastic gear member, and the output hole is formed around the circumference of the input hole at the same angular interval.

According to a preferred embodiment of the present disclosure, the metal ring is formed with an opening concentric with the output hole for the output member to pass through.

In the second aspect of the present disclosure, there is provided a deceleration mechanism comprising a transmission gear according to the first aspect of the present disclosure.

The transmission gear according to the present disclosure has several advantages over the conventional plastic transmission gears, in particular:

- As a support for the plastic material, the metal ring embedded into the plastic gear member of the transmission gear actually separates the inner region of the plastic gear member from the outer region in the radial direction. There would be no dimensional shrinkage for the plastic material of the plastic gear member located inside the metal ring in the radial direction during injection molding, so the arrangement of the metal ring significantly reduces the radial dimensional shrinkage of the plastic gear member during injection molding. In this way, the accuracy of the dimensions of the transmission gear can be improved.
- The strength and rigidity of the transmission gear can be improved by embedding the metal ring in the plastic gear member of the transmission gear, in particular the bending of the transmission gear in the axial direction can be avoided.

The metal ring having a simple structure can be manufactured conveniently and has low cost. Thus, it is suitable for mass production and various types of transmission gears.

BRIEF DESCRIPTION OF THE DRAWINGS

Other features and advantages of the present disclosure will be better understood from the following detailed description of embodiments. In the drawings, the same reference numerals generally refer to the same or similar parts.

DETAILED DESCRIPTION OF EMBODIMENTS

The implementation and use of embodiments are discussed in detail hereinafter. However, it should be understood that the specific embodiments discussed herein are only illustrative of the specific embodiments of the present disclosure, and are not intended to limit the scope of the invention.

It is to be noted that the drawings are not only intended to be illustrative of the present disclosure, but also to facilitate limiting of the present disclosure as necessary.

Figure 1:
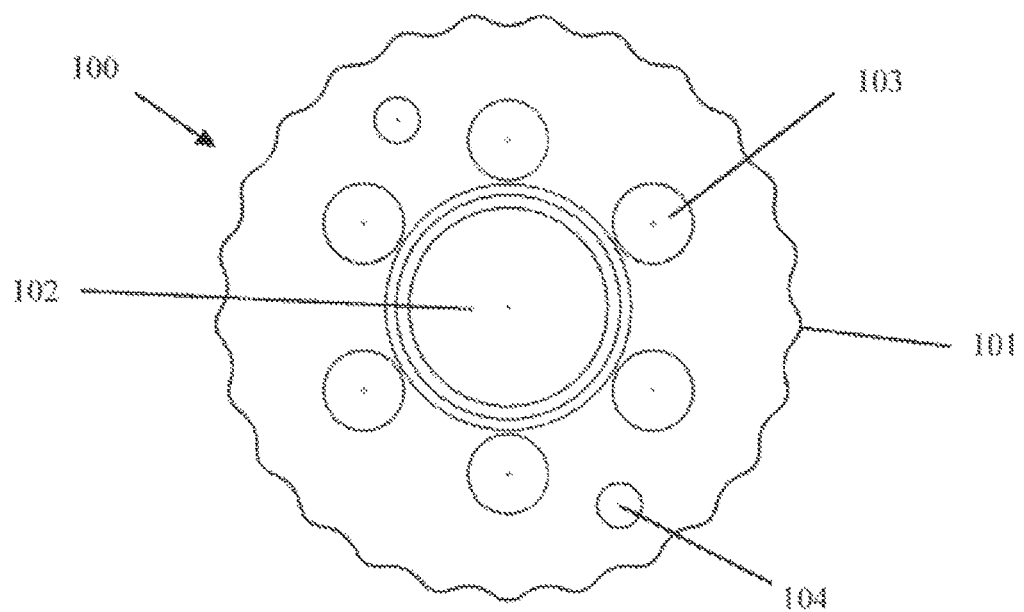
FIG. 1 is a schematic front view of a plastic transmission gear in accordance with the prior art.

As an example, the first and the second embodiments of the present disclosure are improvements based on the plastic transmission gear 100 of FIG. 1. Therefore, the transmission gear according to the present disclosure may be a transmission gear provided in a gear box of a joint of the mechanical arm, for example. Of course, the disclosure is not limited to this. In fact, in the case that the strength condition is satisfied and the transmission load is sufficient, the transmission gear according to the present disclosure can be used as a transmission component in a deceleration mechanism of any type of industrial robot.

Figure 2:
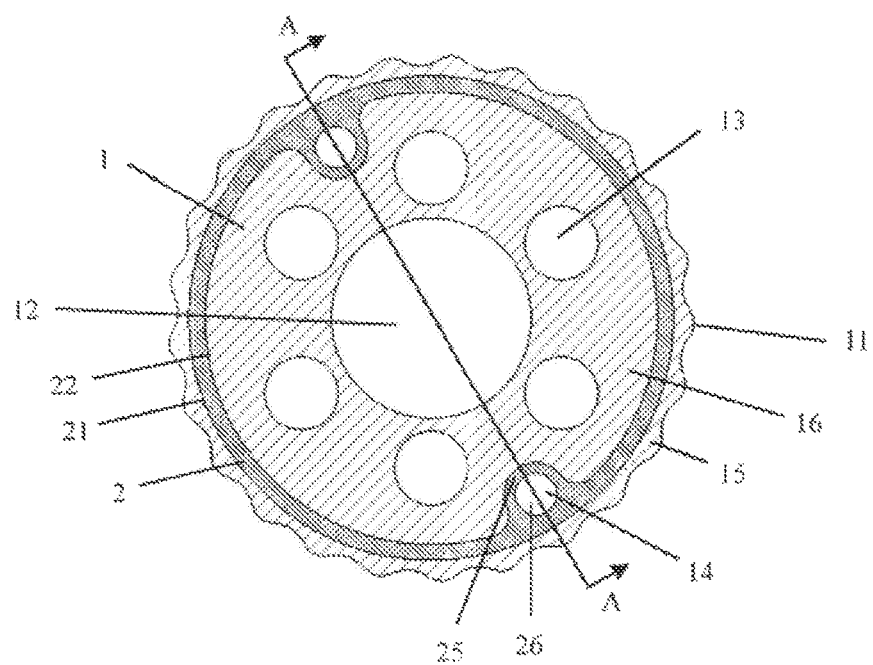
FIG. 2 is a front cross-sectional view of the transmission gear taken along the axially intermediate section thereof in accordance with a first embodiment of the present disclosure.
Figure 3:
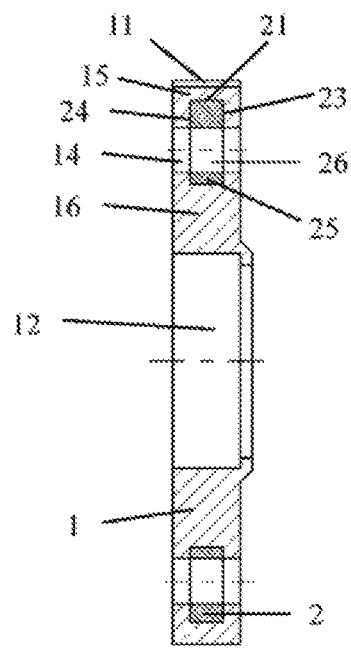
FIG. 3 is a cross-sectional view of the transmission gear taken along a section A-A of FIG. 2.

In the first embodiment shown in FIGS. 2 and 3, the transmission gear according to the present disclosure comprises a metal ring 2 and a plastic gear member 1 integral on an outer and an inner portion with respect to the radial direction and two opposite end faces (i.e., the first end face 23 and the second end face 24) of the metal ring 2 by injection molding. More specifically, during the manufacturing process of such a transmission gear, the metal ring 2 which has been manufactured is first fixed at a specific position in the injection mold. In order to reduce the dimensional shrinkage of the plastic material, the outer ring surface 21 of the metal ring 2 is arranged adjacent to the outer circumference 11 of the plastic gear member 1 obtained, that is, the diameter of the outer ring surface 21 of the metal ring 2 is set to be slightly smaller than the diameter of the outer circumference 11 of the plastic gear member 1 and the diameter of the inner ring surface 22 of the metal ring 2, in the case of meeting the manufacturing conditions, is slightly smaller than the diameter of the outer ring surface 21. Injection molding is then performed to obtain a plastic gear member 1 coaxial with the metal ring 2 and cladding of the metal ring 2. Finally, the assembly formed from the plastic gear member 1 and the metal ring 2 is taken out of the injection mold to obtain such a transmission gear.

In the first embodiment, the shape of the plastic gear member 1 is similar to that of the plastic transmission gear 100 of FIG. 1. Therefore, as shown, the outer region 15 of the plastic gear member 1 located outside the metal ring 2 in the radial direction has an outer circumference 11 that is tooth-shaped and the inner region 16 of plastic gear member 1 located in the metal ring 2 in the radial direction is formed with an input hole 12 through which the input shaft passes and a plurality of output holes 13 through which the output member passes (the six output holes 13 are illustrated) to transmit the torque from the input shaft to the plurality of output members. The input hole 12 is generally formed at a central location of the plastic gear member 1 (more specifically, the inner region 16 of the plastic gear member 1), and the plurality of output holes 13 are formed around the circumference of the input hole 12 at the same angular intervals, for example. The position and number of the output holes 13 are not limited herein and may be determined according to the actual needs. In addition, the torque may also be output by the transmission gear in other manners, so that the plastic gear member 1 may be formed with only the input holes 12 and no output holes 13.

Since the metal ring 2 needs to be accurately located relative to the injection mold before injection molding, a locating portion is required on the metal ring 2. In the first embodiment, as the radial dimension of the metal ring 2 is small, the locating portion includes two protrusions 25 that protrude from the inner ring surface 22 of the metal ring 2 and are symmetrical with respect to the center of the metal ring 2. Each of the protrusions 25 is formed with a locating hole 26, so that the locating member disposed on the injection mold passes through the locating holes 26 to accurately locate the metal ring 2 on the injection mold and thus the metal ring 2 cannot rotate with respect to the injection mold. Moreover, the presence of such protrusions 25 also prevents a relative displacement between the metal ring 2 and the plastic material after injection molding. The number and position of the protrusions 25 (and thus the locating holes 26) are not limited herein and may be determined according to the actual needs. Of course, the position of the protrusions 25 may not interfere with the positions of the input holes 12 and the output holes 13. For example, the locating portion may include two or more protrusions 25, which are preferably arranged at the same angular interval along the circumferential direction of the metal ring 2, and each of the protrusions 25 is formed with a locating hole 26. The term "interference" as used herein and hereinafter should be understood to refer to a positional coincidence in the radial direction. For example, the protrusion 25 used herein cannot be spatially coincident with the input hole 12 and the output hole 13 in the radial direction, that is, the presence of the protrusion 25 may not influence the input shaft passing through the input hole 12 and may not influence the output member passing through the output hole 13.

Further, during injection molding, the locating member disposed on the injection mold passes through the entire axial thickness of the transmission gear. In other words, as shown in FIG. 3, the locating member provided on the injection mold enables a pair of mounting holes 14 concentric with the locating holes 26 to be formed on the plastic gear member 1. Since the pair of mounting holes 14 is visible from the outer surface of the drive gear, when the transmission gear is mounted in the gearbox, the pair of mounting holes 14 can act as a reference to the initial mounting angle for ease of installation.

According to a preferred embodiment, not shown, the outer ring surface 21 of the metal ring 2 is tooth-shaped similar to the outer circumference 11 of the plastic gear member 1. The term "similar" herein is to be understood to refer to designing the tooth shape of the outer ring surface 21 of the metal ring 2 to be a shape that is scaled down from the tooth shape of the outer circumference 11 of the plastic gear member 1 by a certain ratio. It is to be understood that subtle errors may be produced during the manufacturing process and they may be not exactly proportional. In this case, the annular outer region 15 has a substantially uniform radial dimension, which enables the outer ring surface 21 to better conform to the plastic material during injection molding, thus preventing relative displacement between the plastic material and the plastic material metal ring 2 incurred by the uneven plastic material. However, such a tooth-shaped outer ring surface 21 increases the manufacturing cost of the metal ring 2.

As such, in the preferred embodiment shown, in order to reduce the manufacturing cost of the metal ring 2, the outer ring surface 21 of the metal ring 2 has a simple circular shape. Especially in this case, in order to better fit the outer ring surface 21 with the plastic material during injection molding to prevent relative displacement between the metal ring 2 and the plastic material, the outer ring surface 21 can be bonded with the plastic materials more firmly in a specific manner. Preferably, a non-skid coating may be applied to the outer ring surface 21, or alternatively, the outer ring surface 21 may be processed by a particular corrosion treatment or a knurling treatment, for example, NMT (Nano Molding Technology) may be employed.

Also, in order to better fit the inner ring surface 22 of the metal ring 2 and the two end faces with the plastic material during injection molding to prevent relative displacement between the metal ring 2 and the plastic material, the inner ring surface 22, the first end face 23 and the second end face 24 of the metal ring 2 can be bonded with the plastic materials more firmly in a particular manner. Preferably, the inner ring surface 22, the first end surface 23 and the second end surface 24 may be coated with a non-skid coating, or alternatively, the inner ring surface 22, the first end surface 23 and the second end surface 24 may be processed by a particular corrosion treatment or a knurling treatment to bond with the plastic materials more firmly. For example, NMT can be employed.

In order to facilitate mass production and reduce costs, the metal ring 2 can be manufactured by a low-cost manufacturing method with a low-cost material. The material of the metal ring 2 is preferably selected from materials such as aluminum, aluminum alloy, steel, and the like. For example, a metal cylinder having a large axial length may be obtained from a particular profile of a selected material by extrusion or stamping, and the metal cylinder obtained may be sequentially divided into a plurality of metal rings 2 in an axial direction with intended axial length.

It is noted that the diameters of the outer ring surface 21 and the inner ring surface 22 of the metal ring 2 need to be determined according to the actual needs. The diameter of the outer ring surface 21 (and therefore the distance between the outer ring surface 21 and the outer circumference 11 of the plastic gear member 1) generally depends on the plastic material parameters and the target machining accuracy of the plastic gear member 1. The diameter of the inner ring surface 22 generally depends on the particular property of the inner region 16 of the plastic gear member 1, such as the position of the inner ring surface 22 in the first embodiment that should not interfere with that of the output hole 13. Furthermore, the radial thickness of the metal ring 2 cannot be too small, since a radial thickness that is too small makes the manufacturing more difficult.

Figure 4:
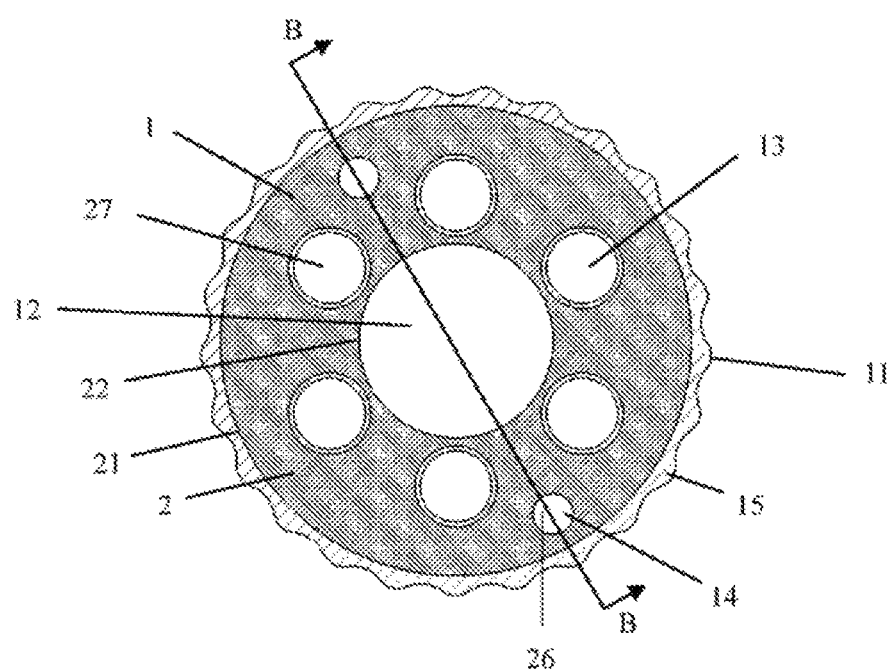
FIG. 4 is a front cross-sectional view of the transmission gear taken along the axially intermediate section thereof in accordance with a second embodiment of the present disclosure.
Figure 5:
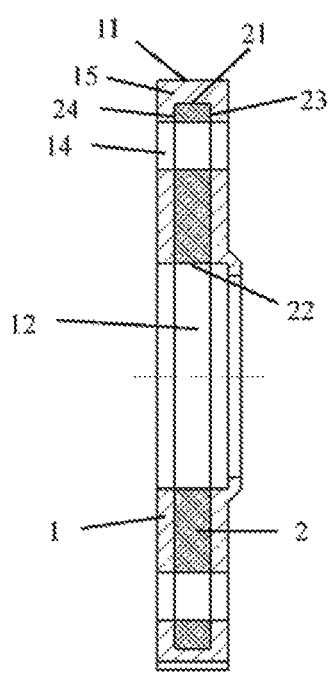
FIG. 5 is a cross-sectional view of the transmission gear taken along a section B-B of FIG. 4.

In the second embodiment shown in FIGS. 4 and 5, the outer ring surface 21 of the metal ring 2 is likewise arranged adjacent to the outer circumference 11 of the plastic gear member 1 to be obtained, i.e. the diameter of the outer ring surface 21 of the metal ring 2 is set to be slightly smaller than that of the outer circumference 11 of the plastic gear member 1. This embodiment differs from the first embodiment in that the inner ring surface 22 of the metal ring 2 is expanded toward the center of the transmission gear up to the circumference of the input hole 12. In other words, the diameter of the inner ring surface 22 of the metal ring 2 is equal to that of the input hole 12. In fact, the diameter of the inner ring surface 22 of the metal ring 2 can be defined to be any value between the diameters of the outer ring surface 22 of the metal ring 2 and the input hole 12 as long as that the manufacturing conditions are met. Of course, if the output hole 13 is provided, the positions of the outer ring surface 21 and the inner ring surface 22 of the metal ring 2 should not interfere with the position of the output hole 13.

In the second embodiment, if the output hole 13 is provided, the metal ring 2 is formed with an opening 27 concentric with the output hole 13 for the output member to pass through. The diameter of the opening 27 generally depends on the plastic material parameters of the desired plastic gear member 1, the target machining accuracy, and the size of the output hole 13. Further, the locating portion of the metal ring 2 includes two locating holes 26 disposed adjacent to the outer ring surface 21 and symmetrical with respect to the center of the metal ring 2. The number and position of the locating holes 26 are not limited herein, and may be determined according to the actual needs. Of course, the position of the locating holes 26 may not interfere with the position of the opening 27, that is, the locating holes 26 may not coincide with the positions of the openings 27. For example, the locating portion may include two or more locating holes 26, which are preferably arranged at the same angular interval along the circumferential direction of the metal ring 2.

The following exemplarily illustrates the effect of setting of the metal ring 2 on the dimensional accuracy of the transmission gear.

For the plastic transmission gear 100 of FIG. 1, assuming that the plastic transmission gear 100 has an average diameter of 50 mm and the plastic material of the plastic transmission gear 100 has a shrinkage ratio of 0.3% at the time of injection molding, the error of the radius of the transmission gear 100 produced by an injection molding is 25*0.3%=0.075 mm.

For the transmission gears according to the first and second embodiments of the invention, assuming that the outer circumference 11 of the plastic gear member 1 has an average diameter of 50 mm, and the average distance between the outer circumference 11 and the circular outer ring surface 21 of the metal ring 2 is 3 mm, and the error of the radius of the transmission gear after injection is 3*0.3%=0.009 mm. Therefore, compared to the plastic transmission gear 100 of FIG. 1, the transmission gear according to the invention has a significantly reduced radial dimensional shrinkage at the time of injection molding, and it has good dimensional accuracy accordingly. Furthermore, the arrangement of the metal ring 2 also improves the strength and rigidity of the transmission gear, in particular, the bending of the transmission gear in the axial direction can be avoided.

The technical content and features of the invention have been disclosed above. However, it is to be understood that those skilled in the art can make various changes and improvements to the above disclosed concepts without departing from the inventive idea of the disclosure, but they are all within the scope of the disclosure.

The description to the above embodiments is illustrative and not limiting, and the scope of the invention is defined by the following claims.

We claim:

1. A transmission gear, comprising:
   a metal ring; and
   a plastic gear member integral with the metal ring by injection molding,
   wherein the metal ring is coaxially wrapped in the plastic gear member and provided with a locating portion including a locating hole in the metal ring for locating the metal ring in an injection mold, wherein the plastic gear member has an outer circumference that is tooth-shaped, and an input hole is formed on the plastic gear member for an input shaft to pass through, and wherein an outer ring surface of the metal ring is arranged adjacent to the outer circumference, and an inner ring surface of the metal ring has a diameter greater than or equal to that of the input hole.

2. The transmission gear of claim 1, wherein the locating portion comprises at least two locating holes arranged in a circumferential direction of the metal ring at the same angular interval, and a mounting hole concentric with the locating hole is formed on the plastic gear member.

3. The transmission gear of claim 1, wherein the outer ring surface of the metal ring is of a tooth shape similar to the outer circumference.

4. The transmission gear of claim 1, wherein the outer ring surface of the metal ring is of a circular shape.

5. The transmission gear of claim 1, wherein a surface of the metal ring is coated with a non-skid coating or processed by corrosion treatment or knurling treatment, to increase a degree of bonding with a plastic material.

6. The transmission gear of claim 1, wherein the material of the metal ring is selected from aluminum, aluminum alloy, or steel.

7. The transmission gear of claim 6, wherein the metal ring is manufactured by extrusion or stamping.

8. The transmission gear of claim 1, wherein an output hole is formed on the plastic gear member for a plurality of output members to pass through, the position of the output hole does not interfere with the positions of an outer ring surface, an inner ring surface and a locating portion of the metal ring.

9. The transmission gear of claim 8, wherein the input hole is formed at a center position of the plastic gear member, and the output hole is formed around the circumference of the input hole at the same angular interval.

10. The transmission gear of claim 8, wherein the metal ring is formed with an opening concentric with the output hole for the output member to pass through.

11. A deceleration mechanism, comprising a transmission gear of claim 1.

12. A transmission gear, comprising:
    a metal ring; and
    a plastic gear member integral with the metal ring by injection molding,
    wherein the metal ring is coaxially wrapped in the plastic gear member and provided with a locating portion including a locating hole in the metal ring for locating the metal ring in an injection mold and a mounting hole concentric with the locating hole, wherein the plastic gear member has an outer circumference that is tooth-shaped, and an input hole is formed on the plastic gear member for an input shaft to pass through, and wherein an outer ring surface of the metal ring is arranged adjacent to the outer circumference, and an inner ring surface of the metal ring has a diameter greater than or equal to that of the input hole.

13. The transmission gear of claim 12, wherein the locating portion comprises at least two locating holes arranged in a circumferential direction of the metal ring at the same angular interval, each of the locating holes having a mounting hole concentric therewith formed on the plastic gear member.

14. The transmission gear of claim 12, wherein the outer ring surface of the metal ring is of a tooth shape similar to the outer circumference.

15. The transmission gear of claim 12, wherein the outer ring surface of the metal ring is of a circular shape.

16. The transmission gear of claim 12, wherein a surface of the metal ring is coated with a non-skid coating or processed by corrosion treatment or knurling treatment, to increase a degree of bonding with a plastic material.

17. The transmission gear of claim 12, wherein the material of the metal ring is selected from aluminum, aluminum alloy, or steel.

18. The transmission gear of claim 17, wherein the metal ring is manufactured by extrusion or stamping.

19. The transmission gear of claim 12, wherein an output hole is formed on the plastic gear member for a plurality of output members to pass through, the position of the output hole does not interfere with the positions of an outer ring surface, an inner ring surface and a locating portion of the metal ring.

20. The transmission gear of claim 19, wherein the input hole is formed at a center position of the plastic gear member, and the output hole is formed around the circumference of the input hole at the same angular interval.

* * * * *